United States Patent

Dodge et al.

[11] Patent Number: 5,708,073
[45] Date of Patent: Jan. 13, 1998

[54] NON-AQUEOUS, BASE-DEGRADABLE POLYURETHANE

[75] Inventors: Jeffrey A. Dodge, Wexford; Ashok M. Sarpeshkar, Upper St. Clair; Peter H. Markusch, McMurray, all of Pa.; Jeffrey F. Dormish, Hudson, Ohio

[73] Assignee: Bayer Corporation, Pittsburgh, Pa.

[21] Appl. No.: 652,884

[22] Filed: May 23, 1996

[51] Int. Cl.$^6$ .................. C08J 3/00; C08K 3/20; C08L 75/00; C08G 18/00
[52] U.S. Cl. .................. 524/590; 524/539; 524/589; 528/44; 528/66; 528/76; 528/80; 528/85
[58] Field of Search .................. 524/539, 589, 524/590; 528/44, 66, 76, 80, 85

[56] References Cited

U.S. PATENT DOCUMENTS

| | | | |
|---|---|---|---|
| 4,053,666 | 10/1977 | Taylor et al. | 428/35 |
| 4,055,441 | 10/1977 | Taylor et al. | 134/10 |
| 4,293,474 | 10/1981 | Dieterich et al. | 260/29.2 TN |
| 4,622,360 | 11/1986 | Gomi et al. | 524/507 |
| 4,764,553 | 8/1988 | Mosbach et al. | 524/591 |
| 5,126,393 | 6/1992 | Blum et al. | 524/590 |
| 5,380,779 | 1/1995 | D'Haese | 524/272 |

*Primary Examiner*—Patrick Niland
*Attorney, Agent, or Firm*—Joseph C. Gil; Noland J. Cheung

[57] ABSTRACT

The present invention is directed to a non-aqueous, base-degradable polyurethane. The polyurethane is prepared by reacting an organic polyisocyanate with a hydroxyl group containing hydrophilic composition. The hydrophilic composition must have specified amounts of ionic or acidic groups and specific amounts of polyester groups. In a preferred embodiment, the hydrophilic composition also contains polyoxyethylene groups.

2 Claims, No Drawings

NON-AQUEOUS, BASE-DEGRADABLE POLYURETHANE

BACKGROUND OF THE INVENTION

Hydrophilic polyurethanes can be obtained by ionic (cationic and/or anionic) and non-ionic-hydrophilic (i.e., polyoxyethylene) modification (see, e.g., U.S. Pat. Nos. 4,293,474 and 4,764,553). They play an important role in the synthesis of waterborne polyurethanes. Aqueous solutions of polyurethanes have also been disclosed. However, in almost all of these compositions the amount of hydrophilic groups or hydrophilic group precursors is kept to a minimum in order to achieve water resistance of films derived from these materials. These hydrophilic modifications are performed to obtain aqueous dispersions or solutions of polyurethanes which form films upon evaporation of the water.

U.S. Pat. Nos. 4,053,666 and 4,055,441 describe the coating of a glass container with a decoratable, water-removable, organic polymeric film. The film can be subsequently removed and the glass container can then be recovered, recycled and reused. These references broadly suggest that the film can be an emulsifiable polyurethane, but do not give any guidance as to how to produce such a composition.

An aqueous polyurethane composition which can be removed with a ligand containing alkaline solution is described in U.S. Pat. No. 4,622,360. Finally, pressure sensitive adhesives are known which are dissolvable in water (see U.S. Pat. No. 5,380,779). The adhesives described, which are apparently dissolvable in water, are mixtures of terpolymers and various additives. The terpolymers are prepared from i) acrylic or methacrylic esters of non-tertiary alcohols, ii) polar monomers containing hydroxy, carboxy or sulfonic acid functionality, or salts thereof and iii) a water dispersible macromolecular monomer. Among the macromolecular monomers described is the reaction product of an isocyanate and a monohydroxy or monoamine terminated poly(alkylene oxide).

The purpose of the present invention was to provide polyurethane compositions that are unaffected by exposure to water, but which lose integrity, dissolve or decompose in aqueous bases. When used as laminating adhesives these base-degradable polyurethanes allow the removal of the polymer and recovery of the associated substrates.

DESCRIPTION OF THE INVENTION

The present invention is directed to non-aqueous, two-component polyurethane compositions that contain hydrophilic groups and/or hydrophilic group precursors. They form films, adhesives and coatings in the absence of water. The cured films can be dissolved/degraded by aqueous bases at a later time. More particularly, the present invention is directed to a non-aqueous, base-degradable polyurethane composition comprising the reaction product of:

a) an organic polyisocyanate, with b) a hydroxyl group containing hydrophilic composition, said hydrophilic composition having an average hydroxyl functionality of from about 1.5 to about 4 and containing, i) at least 0.1% by weight, based upon the total weight of said hydrophilic composition, of one or more ionic or acidic groups selected from the group consisting of carboxylate, sulfonate, carboxylic acid and sulfonic acid, and ii) at least 25% by weight, based upon the total weight of said hydrophilic composition, of carboxylic acid ester groups, and wherein said hydrophilic composition comprises:

b)1) from 50 to 95% by weight, based upon the total weight of said hydrophilic composition, of one or more non-ionic polyester polyols having molecular weights of from 200 to 6000, b)2) from 1 to 50% by weight, based upon the total weight of said hydrophilic composition, of one or more organic hydroxy-group containing materials having molecular weights of from 92 to 500 and containing one or more ionic or acidic groups selected from the group consisting of carboxylate, sulfonate, carboxylic acid and sulfonic acid, and b)3) from 0 to 45% by weight, based upon the total weight of said hydrophilic composition, of one or more hydroxyl functional organic compounds having molecular weights of from 600 to 6000, having hydroxyl functionalities of from 1 to 4, and containing no ester groups, wherein components b)1), b)2) and b)3) total 100%, and wherein components a) and b) are reacted at an isocyanate index of from about 80 to about 150.

In the most preferred embodiment of the present invention, the hydrophilic composition (i.e., component b)) also contains iii) at least 20% by weight, based upon the total weight of said hydrophilic composition, of polyoxyethylene groups of at least 5 oxyethylene units in length.

All molecular weights referred to herein are number average molecular weights ($M_n$) and are determined by end group analysis.

A composition is "base-degradable" according to the present invention if a film of thickness of from 0.001 to 0.010 inches, when placed in an aqueous 3% sodium hydroxide solution at 70° C., within 60 minutes, either a) completely dissolves or b) completely loses its adhesiveness and integrity.

The composition of the present invention is prepared by reacting an organic polyisocyanate with a specific hydroxyl group containing composition. Substantially any polyisocyanate may be used. Examples of suitable polyisocyanates include polyisocyanates represented by the formula

in which x is a number from 2 to 4 and R represents an organic group obtained by removing the isocyanate groups from an organic polyisocyanate having a molecular weight of from about 112 to 1,000, and preferably from about 140 to 400. Preferred polyisocyanates are those represented by the above formula in which R represents an aromatic hydrocarbon group. Examples of suitable organic polyisocyanates include 1,4-tetramethylene diisocyanate, 1,6-hexamethylene diisocyanate, 2,2,4-trimethyl-1,6-hexa-methylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanato-cyclohexyl)-methane, 1,3- and 1,4-bis-(isocyanato-methyl)-cyclohexane, diisocyanatodicyclohexylpropane-(2,2), bis-(4-isocyanato-3-methyl-cyclohexyl)-methane, α,α,α',α'-tetramethyl-1,3- and/or-1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, diisocyanatodiphenylpropane-(2,2), p-xylylene diisocyanate, 2,4"-and/or 4,4'-diphenylmethane diisocyanate and 1,5-diisocyanato naphthalene and mixtures thereof. Aromatic polyisocyanates containing 3 or more isocyanate groups such as 4,4',4"-triphenylmethane triisocyanate and polyphenyl polymethylene polyisocyanates obtained by phosgenating aniline/formaldehyde condensates may also be used. The known modified polyisocyanates, such as polyisocyanates containing carbodiimide groups, allophanate groups, isocyanurate groups, urethane groups, and/or biuret groups, may also be used. Preferred diisocyanates are polyphenyl polymethylene polyisocyanates, and most preferred are urethane-modified polyphenyl polymethylene polyisocyanates.

The hydroxyl group-containing hydrophilic composition useful herein must have an average hydroxyl functionality of from about 1.5 to about 4 and must contain i) at least 0.1% by weight (and preferably from 0.4 to 2.5% by weight), based upon the total weight of said hydrophilic composition, of one or more ionic or acidic groups selected from the group consisting of carboxylate, sulfonate, carboxylic acid and sulfonic acid, and ii) at least 25% by weight (and preferably from 25 to 50% by weight), based upon the total weight of said hydrophilic composition, of carboxylic acid ester groups.

As noted above, in the preferred embodiment, the hydrophilic composition also contains iii) at least 20% by weight (and preferably from 30 to 50% by weight), based upon the total weight of said hydrophilic composition, of polyoxyethylene groups of at least 5 oxyethylene units in length.

The hydrophilic composition itself comprises:

b)1) from 50 to 95% by weight, based upon the total weight of said hydrophilic composition, of one or more non-ionic polyester polyols having molecular weights of from 200 to 6000, b)2) from 1 to 50% by weight, based upon the total weight of said hydrophilic composition, of one or more organic hydroxy group-containing materials having molecular weights of from 92 to 500 and containing one or more ionic or acidic groups selected from the group consisting of carboxylate, sulfonate, carboxylic acid and sulfonic acid, and b)3) from 0 to 45% by weight, based upon the total weight of said hydrophilic composition, of one or more hydroxyl functional organic compounds having molecular weights of from 600 to 6000, having hydroxyl functionalities of from 1 to 4, and containing no ester groups, wherein components b)1), b)2) and b)3) total 100%, The key to the present invention resides in the amounts of ionic and/or acidic groups and ester groups. Accordingly, within those parameters a wide variety of different materials can be used.

The compositions according to the invention preferably contain ethylene glycol units in the form of polyoxyethylene units. The preferred polyoxyethylene group content (i.e., b)iii)) can be provided via the polyester diol (b)1)) (e.g., by using a polyoxyethylene diol as all or a portion of the diol used to prepare the polyester), via the ionic group containing compound (b)2)), via the hydroxy functional compound (b)3)), or via any combination thereof.

Suitable polyester polyols (component b)1))include reaction products of polyhydric alcohols and polybasic carboxylic acids. Preferred are products of dihydric alcohols and dibasic carboxylic acids. Instead of these dicarboxylic acids, the corresponding carboxylic acid anhydrides or polycarboxylic acid esters of lower alcohols or mixtures thereof may be used for preparing the polyesters. The dicarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic add, which may be mixed with monomeric fatty acids; dimethyl terephthalates and bis-glycol terephthalate. Suitable dihydric alcohols include, e.g. ethylene glycol; propylene glycol-(1,2) and -(1,3); butylene glycol-(1,4) and-(1,3); hexanediol-(1,6); octanediol-(1,8); neopentyl glycol; 1,4-bis-hydroxymethyl-cyclohexane; 2-methyl-1,3-propanediol; 2,2,4-trimethyl-1,3-pentanediol; triethylene glycol; tetraethylene glycol; polyethylene glycols; dipropylene glycol; polypropylene glycols; and dibutylene glycol and polybutylene glycols. Polyesters of lactones, e.g. ε-caprolactone or hydroxy-carboxylic acids, e.g. Ω-hydroxycaproic acid, may also be used. It is preferred that the polyester diols be prepared from polyoxyethylene glycols having molecular weights of from about 220 to about 2000.

The hydroxyl group-containing hydrophilic composition must also contain from 1 to 50% by weight, based upon the total weight of the hydrophilic composition, of one or more organic hydroxy group-containing materials having molecular weights of from 92 to 500 and containing one or more ionic or acidic groups selected from the group consisting of carboxylate, sulfonate, carboxylic acid and sulfonic acid. Suitable organic alcohols and polyols containing one or more ionic or acidic groups selected from the group consisting of carboxylates, sulfonates, carboxylic acid and sulphonic acid are known and described in U.S. Pat. Nos. 3,479,310, 4,108,814 and 4,303,774, the disclosures of which are herein incorporated by reference. The preferred sulfonate group containing hydroxy group-containing materials are the diol sulfonic acids and the diol sulfonates disclosed in U.S. Pat. No. 4,108,814.

The preferred carboxylate group containing hydroxy group-containing materials are hydroxy-carboxylic acids of the general formula:

wherein

Q represents a hydrocarbon radical containing 1 to 12 carbon atoms, and y represents a value of from 1 to 3, x represents a value of from 1 to 3.

Examples of these hydroxy-carboxylic acids include citric acid and tartaric acid. The preferred acids are those of the above-mentioned formula wherein y=1, and x=2. These dihydroxy alkanoic acids are described in U.S. Pat. No. 3,412,054, the disclosure of which is herein incorporated by reference. The preferred group of dihydroxy alkanoic acids are the α,α-dimethylol alkanoic acids represented by the structural formula

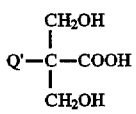

wherein Q' is hydrogen or an alkyl group containing 1 to 8 carbon atoms. The most preferred compound is α,α-dimethylol propionic acid, i.e., when Q' is methyl in the above formula.

Finally, the hydroxyl group-containing hydrophilic composition may contain from 0 to 45% by weight, based upon the total weight of said hydrophilic composition, of one or more hydroxyl functional organic compounds having molecular weights of from 600 to 6000, having hydroxyl functionalities of from 1 to 4, and containing no ester groups. Examples of such compounds are hydroxy functional polyethers, hydroxy functional polycarbonates, hydroxy functional polyacetal, and hydroxy functional polythioethers. The polyether polyols are preferred. Most preferred are polyethers containing polyoxyethylene chains.

Polycarbonates containing hydroxyl groups include those known per se such as the products obtained from the reaction of diols such as propanediol-(1,3), butanediol-(1,4) and/or hexanediol-(1,6), diethylene glycol, triethylene glycol or tetraethylene glycol with phosgene, diarylcarbonates such as diphenylcarbonate or with cyclic carbonates such as ethylene or propylene carbonate.

Suitable hydroxy functional polyethers are obtained in a known manner by the reaction of starting compounds which contain one or more reactive hydrogen atoms with alkylene oxides such as ethylene oxide, propylene oxide, butylene oxide, styrene oxide, tetrahydrofuran, epichlorohydrin or mixtures of these alkylene oxides. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)-ethane.

Polyethers which have been obtained by the reaction of starting compounds containing amino groups can also be used, but are less preferred for use in the present invention. Suitable amine starting compounds include ammonia, methyl amine, tetramethylene diamine, ethanolamine, diethanolamine, triethanolamine, ethylene diamine, diethylene triamine, triethylene tetramine, 1,6-hexane diamine, piperazine, 2,5-dimethyl piperazine, 1-amino-3-aminomethyl-3,3,5-trimethyl cyclohexane, bis-(4-aminocyclohexyl)-methane, bis-(4-amino-3-methylcyclohexyl)-methane, 1,4-cyclohexane diamine, 1,2-propane diamine, hydrazine, aminoacid hydrazides, hydrazides of semicarbazido carboxylic acids, bis-hydrazides, bis-semicarbazides, aniline, phenylene diamine, 2,4- and 2,6-toluylene diamine, polyphenylene polymethylene polyamines of the kind obtained by the aniline/formaldehyde condensation reaction and mixtures thereof. Resinous materials such as phenol and cresol resins may be used as the starting materials.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Patent No. 1,152,536). Also suitable as polyethers are amino polyethers wherein at least a portion of the hydroxyl groups of the previously described polyethers are converted to amino groups.

The preferred starting compounds for the polyethers are those compounds which exclusively contain hydroxyl groups, while compounds containing tertiary amine groups are less preferred and compounds containing isocyanate-reactive-NH groups are much less preferred.

Among the polythioethers which should be particularly mentioned are the condensation products obtained from thiodiglycol on its own and/or with other glycols, or amino alcohols.

Suitable polyacetals include the compounds which can be prepared from aldehydes, e.g. formaldehyde, and glycols such as diethylene glycol, triethylene glycol, ethoxylated 4,4'-dihydroxy-diphenyldimethylmethane, and hexanediol-(1,6). Polyacetals suitable for the purpose of the invention may also be prepared by the polymerization of cyclic acetals.

The monohydroxy compounds are generally known in polyurethane chemistry can also be used as component b)3). Monofunctional polyethers are preferably used. The monofunctional hydrophilic components are produced in accordance with the processes described in U.S. Pat. Nos. 3,905,929 and 3,920,598 by alkoxylating of a monofunctional starter, such as n-butanol, using ethylene oxide and optionally another alkylene oxide, for example propylene oxide.

The invention is directed toward polyurethanes which can be ultimately removed by soaking in aqueous alkaline solution. The formulation consists of a two-component polyurethane (optionally containing solvent). The material can be cured at ambient temperatures. Cure times can be shortened accordingly by employing catalysts or elevated temperatures. The materials are generally rubbery and highly flexible. The elastomeric nature of the materials makes them useful in a wide variety of applications. Although compositions according to the invention are not affected by water alone, the base-sensitivity of the composition makes them especially useful in applications where eventual delamination of the laminated composite or coating is desirable. Thus, a composite bonded with the material of the present invention could be disassembled and the substrates reclaimed by immersion in or soaking with aqueous NaOH. Aluminum foil/paper laminates, such as those used in cigarette packaging, become more expensive as the cost of aluminum increases. As the cost increases, it is more desirable to reclaim and recycle the aluminum. Such composites typically cannot be delaminated because the adhesives used in their manufacture produce a strong, permanent bond. This adhesive bond cannot be broken without destroying the substrates. Using the claimed polyurethane, one or both of the substrates could be recovered by immersion in aqueous sodium hydroxide. Compositions of this invention could also be used to encapsulate materials (such as fertilizers, insecticides, herbicides, and the like) to achieve slow release over time in the presence of aqueous basic media (such as soil). The polyurethane of the invention could also be used as a removable protective coating on floors, plastic parts, mirrors, electronic pads, and the like.

WORKING EXAMPLES

The materials used for the blends described below are listed here as Polyols A through F and isocyanate.

Polyol A: A trimethylolpropane-started polyether/ester triol composed of adipic acid, and poly(ethyleneoxide) (PEO), having a molecular weight of about 4550.

Polyol B: 2,2-bis(hydroxymethyl)propionic acid (DMPA), having a molecular weight of 134.

Polyol C: Propoxylated sodium salt of 1,4-dihydroxy-2-butane sulfonic acid having a molecular weight of about 610.

Polyol D: n-butylcarbitol-started poly(ethyleneoxide)/poly(propyleneoxide) mono-ol having a molecular weight of about 2200, where the ratio of PO/EO groups is 16/84.

Polyol E: Bisphenol A-started poly(propyleneoxide) polyol having a molecular weight of about 550.

Polyol F: A polyester prepared from 1,4-butanediol and adipic acid, having a molecular weight of 2000 and a functionality of 2.

Isocyanate: A urethane-modified polyisocyanate prepared by the reaction of a polymeric diphenylmethane diisocyanate (2,4' isomer content about 1.6%, functionality about 2.8) with Polyol D to achieve an NCO content of about 20%.

Formulations 1–4 in the Table below are experiments carried out to demonstrate the base-degradability of formulations according to the invention. The reaction mixtures were cast onto glass plates using a draw-down bar. After curing at 110° C. for 30 minutes, the resultant films were about 0.005 inches thick. Small pieces (ca. 1 cm²) of the films were carefully peeled off the glass and immersed in a 3% aqueous NaOH solution at 70° C. While rapidly stirred using a magnetic stir bar and plate, the degradation time was measured from the time the sample was immersed until the film sample had completely broken apart.

formulation, which contains only 4.5% by weight of PEO in the polyol blend, takes 45 minutes to decompose. This experiment illustrates the desirability of having significantly more PEO units in the final product.

In Formulation 4, the DMPA was left out of the mixture. This material contains only PEO and sodium sulfonate groups. It took 45 minutes to degrade.

These experiments clearly indicate the desirability of a material which contains PEO, sodium sulfonate and carboxylic acid groups. Although Formulations 2, 3 and 4 are also within the scope of the invention, Formulation 1 is the preferred embodiment.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A non aqueous, based-degradable polyurethane composition comprising the reaction product of:

a) an organic polyisocyanate, with b) a hydroxyl group containing hydrophilic composition, said hydrophilic composition having an average hydroxyl functionality of from 1.5 to about 4 and containing,

|  | Formulation 1 | Formulation 2 | Formulation 3 | Formulation 4 |
| --- | --- | --- | --- | --- |
| Polyol A | 84.6 parts | 91.2 | 0 | 85.2 |
| Polyol B | 1.7 | 1.8 | 2.4 | 0 |
| Polyol C | 6.3 | 0 | 8.9 | 6.9 |
| Polyol D | 3.7 | 4 | 5.3 | 4 |
| Polyol E | 2.8 | 3 | 3.9 | 3 |
| Polyol F | 0 | 0 | 78.4 | 0 |
| Average OH functionality of the blend of polyols | 2.79 | 2.84 | 1.93 | 2.79 |
| % by weight ethylene oxide units in the polyol blend | 47.6% | 49% | 4.5% | 46% |
| % by weight of ionic/acidic groups in the polyol blend | 1.6% | 0.6% | 2.3% | 1.2% |
| % by weight of ester/groups in the polyol blend | 42.3% | 45.6% | 78.4% | 42.6% |
| Toluene | 0.8 | 0 | 1.1 | 0.9 |
| Dimethyltin-dilurate cat. | 0.09 | 0.09 | 0.09 | 0.07 |
| Isocyanate | 24.3 | 19.9 | 34.0 | 19.9 |
| Index | 95 | 95 | 95 | 95 |
| degradation time | 9 mins. | 20 mins. | 45 mins. | 45 mins. |

The preferred embodiment is shown in the Table as Formulation 1. This system contains Polyols A–E. Thus, the polymer structure contains all of the preferred ingredients required for minimum decomposition time: poly(ethyleneoxide) units (from Polyols A and D), carboxylic acid groups, and sulfonate groups. When reacted with the polymeric isocyanate described above at an NCO/OH index of 0.95, the resultant films degrade within 9 minutes after immersion in 3% (w/w) aqueous NaOH at 70° C.

In order to confirm the desirability of having all three chemical groups (PEO, carboxylic acid, and sulfonate), experiments were conducted where one of these key ingredients was left out.

In the first of these experiments (Formulation 2), polyol C was left out of the mixture. This formulation contains PEO and carboxylic acid units, but no sodium sulfonate. Films of this material took 20 minutes to degrade in aqueous NaOH under the same conditions above.

In Formulation 3, Polyol F, which contains no PEO, was substituted for Polyol A. As shown in the Table, this i) at least 0.1% by weight, based upon the total weight of said hydrophilic composition, of one or more ionic or acidic groups selected from the group consisting of carboxylate, sulfonate, carboxylic acid and sulfonic acid, and ii) at least 25% by weight, based upon the total weight of said hydrophilic composition, of carboxylic acid ester groups, iii) at least 20% by weight, based upon the total weight of said hydrophilic composition, of polyoxyethylene groups of at least 5 oxyethylene units in length, and wherein said hydrophilic composition comprises:

b)1) from 50 to 95% by weight, based upon the total weight of said hydrophilic composition, of one or more non-ionic polyester polyols having molecular weights of from 200 to 6000, b)2) from 1 to 50% by weight, based upon the total weight of said hydrophilic composition, of one or more organic hydroxy group-containing materials having number average molecular weights of from 92 to 500 and containing one or more ionic or acidic groups selected from the group consisting of carboxylate, sulfonate, carboxylic acid and sulfonic acid, and b)3) from 0 to 45% by weight, based upon the total weight of said hydrophilic composition, of one or more hydroxyl functional organic compounds having number average molecular weights for from 600 to 6000, having hydroxyl functionalities of from 1 to 4, and containing no ester groups, wherein components b)1), b)2) and b)3) total 100%, and wherein components a) and b) are reacted at an isocyanate index of from about 80 to about 150.

2. The composition of claim 1, wherein said hydrophilic composition comprises from i) at least 0.4 to 2.5% by weight, based upon the total weight of said hydrophilic composition, of one or more ionic or acidic groups selected from the group consisting of carboxylate, sulfonate, carboxylic acid and sulfonic acid, ii) from 25 to 50% by weight, based upon the total weight of said hydrophilic composition, of carboxylic acid ester groups, and iii) from 30 to 50% by weight based upon the total weight of said hydrophilic composition, of polyoxyethylene groups of at least 5 oxyethylene units in length.

* * * * *